UNITED STATES PATENT OFFICE 2,568,202

PROCESS FOR RECOVERING STEROLS FROM MIXTURES THEREOF

Johan Overhoff, Amsterdam-Z, and Johannes Thomas Hackmann, Heiloo, Netherlands, assignors to N. V. Veenendaalsche Sajet- en Vijfschachtfabriek voorheen Wed. D. S. van Schuppen & Zoon, Veenendaal, Netherlands No Drawing. Application February 14, 1946, Serial No. 647,658. In the Netherlands November 28, 1941

Section 1, Public Law 690, August 8, 1946
Patent expires November 28, 1961

15 Claims. (Cl. 260—397.2)

This invention relates to processes for recovering sterols from materials containing same together with other substances.

It is the ultimate object of the invention to provide a process of extracting and preparing sterols of all types from materials containing same in a simple, efficient and economical manner and with exceptionally good yields.

It is also the object of the invention to provide a process which makes it possible to prepare and extract cholesterol as well as stigmasterol, sitosterol, ergosterol and phytosterol from materials containing same, e. g. cholesterol from wool grease, brain- and spine-tissue and other materials containing cholesterol, stigmasterol from soya beans, etc., sitosterol from cereal germs, etc., ergosterol from yeast, etc., phytosterol from talloil (obtained in great quantities in the production of wood cellulose) etc. The extraction of the different sterols is always performed making use of the same principle.

The process according to the invention for recovering sterols or their addition products from sterol containing substances consists in the conversion of the sterols with salts or substances consists in the conversion of the sterols with salts or substances capable of forming salts under the conditions of the reaction, into addition products of the sterols with said salts and separating the addition products from the reaction mixture. The separation is preferably performed with the aid of organic solvents.

The best known process for separating a sterol, i. e. cholesterol from sterol containing starting material such as wool grease consists in the preparation of addition products of cholesterol with digitonin. Due to the high price of the digitonin this method can only be used for analytical purposes.

According to the invention, however, a process is provided which is considerably cheaper and which also gives good yields of sterol.

The salts which are suitable for the application of the invention are those which form addition compounds with lower aliphatic alcohols or with mono- or polyvalent phenols.

According to the invention, salts, and more especially metal salts of inorganic or organic acids can be used including halides, nitrates, sulphates, etc. as well as acetates, succinates, benzoates, salicylates, sulphonates, etc. Neutral, acid or basic and, if desired, also crystallized salts containing water can be used or salts in the form of their addition combinations with alcohols or phenols.

In some cases it is desirable and in order to obtain higher yields it may be necessary to add a certain amount of water in addition to the hydratation water, which is often present in crystallized salts; the amount of water to be added depends upon the addition products which it is desired to isolate. The sterol content of the starting material and the nature of the salt with which the addition product is to be obtained, are controlling. In practice the amount of water to be added is established with the aid of a few preliminary experiments and is always small, being about equal to the amount of hydratation water present. The addition of large amounts of water would interfere with the formation of the addition products, as large amounts of water bring about their decomposition.

When using manganese salts, especially manganous chloride, it is necessary in order to obtain good yields to add a small amount of water, e. g. of about 0.2 to 5% calculated on the starting material. As stated above too much water must not be added as larger amounts of water would bring about a more or less advanced decomposition of the addition product.

In other cases the addition of water is not necessary at all, even when salts not containing hydratation water are used; this is e. g. the case when anhydrous zinc chloride is used.

Salts of a large number of metals may be used, e. g. those of the metals of the alkaline earths, including magnesium and aluminum, of manganese, iron, zinc, cadmium and tin. Good yields were obtained with the halides and more especially the chlorides of the said metals. Salts of the alkali metals, including ammonium salts, are also suitable for preparing addition products with sterols. The salts which have been found to be useful in our process are those selected from a group consisting of the soluble halides, nitrates, sulfates, acetates, benzoates, salicylates and sulfonates of the alkali metals, the alkaline earth metals, magnesium, aluminum, iron, tin, chromium, zinc, manganese, cobalt and cadmium.

If desired the process may be performed at room temperature or at higher temperatures, e. g. at a temperature of about 100° C.

The sterols to be produced may be present in the natural starting materials in the form of free sterols, but more often they are generally present therein as esters of higher molecular fatty acids.

In order to produce sterols from the esters according to the invention the esters must first be broken down into acids and free sterols. This can be accomplished by saponification, after which the sterols are recovered from the unsaponifiable portion.

In order to exclude side reactions as far as possible, it is advisable to remove certain substances, such as proteins, from the starting material before the saponification step. This is especially profitable when cholesterol is produced from egg-yolk, brain- or spine-tissue, blood flour, meat and the like materials.

The process according to the invention can be performed in different manners; the sterol-containing starting material and the salt may be reacted without addition of further reagents, or in the presence of an organic solvent, e. g. an alcohol.

The simplest and at the same time very efficient method consists in heating the sterol containing product, e. g. the unsaponifiable portion of wool grease for some time together with the metal salt, e. g. anhydrous or crystallized calcium chloride. In order the separate the addition product formed, the resulting mass which is obtained is then treated with a solvent, wherein the addition product is only slightly soluble or altogether insoluble, while the impurities are soluble in the solvent. In the case of the addition product of cholesterol with calcium chloride acetone is a suitable solvent.

Alternate methods consist in reacting the metal salt and the sterol in solution, by adding the salt to an alcoholic solution of the starting material, or by adding a solution of the salt to the sterol-containing product, the insoluble addition compound obtained in either case being then separated from the reaction mixture.

When reacting the sterols with the salts in organic solutions the reaction may be conducted at room temperature or at elevated temperature. The reaction time is shortened by the use of elevated temperatures.

The addition products of sterols and salts are very unstable, making their production in a pure condition very difficult. The addition of slightly greater amounts of water than that specified above brings about decomposition of the addition products. Other compounds containing hydroxyl ions have a similar influence on the addition products.

The solubility of the addition products formed according to the invention differs greatly from the solubility of their constituent components. In extracting the addition products from the starting material use is made of these differences in solubility, e. g. as described above for the calcium chloride addition product.

The fact that some of the products formed are soluble in solvents wherein their constituents are insoluble proves that an addition has taken place. This is e. g. the case with several addition products with chrominum salts which are soluble in benzene with the characteristic green color of chromium compounds. Chromium salts are completely insoluble in benzene.

A remarkable property of the addition products according to the invention consists in the fact that the presence of small amounts of certain substances greatly influences their solubility in organic solvents. The pure addition products are generally slightly soluble in many pure organic solvents. The presence of substances such as wool grease alcohols and certain constituents thereof and other higher alcohols and soaps of fatty acids of wool grease and of other higher fatty acids greatly increases the solubility of the addition products in organic solvents.

When isolating and purifying the addition products therefore care must be taken that the unsaponifiable starting material has been completely freed from soaps of fatty acids of wool grease.

In the same way the alcohols of wool grease increase the solubility of the addition products in organic solvents; for example the addition product with manganous chloride is insoluble in pure iso-octane, but is partly soluble in iso-octane containing wool grease alcohols.

For certain purposes it may be advantageous to increase the solubility of addition products or to maintain them completely soluble. In these cases it is advisable to add an agent to increase the solubility.

The addition products obtained according to the invention can be easily decomposed, e. g. by the addition of water or aqueous solutions, by shortpath high vacuum distillation, also called molecular distillation, etc. The cholesterol or other sterol so freed from the addition product generally contains impurities and can be further purified.

The further purification of the separated sterol can also be performed in other ways than by renewed formation of addition products. The sterols can e. g. be further purified by recrystallization from suitable solvents. Thus ethylacetate, allyl chloride or ethylalcohol are suitable solvents for the purification of cholesterol by recrystallization.

It is also possible to use two liquids which are mutually not miscible or only slightly miscible, one of the liquids having a stronger solubilizing capacity for the impurities than the second liquid, whereas the sterols are more soluble in the second liquid than in the first.

The invention is illustrated but by no means limited by the following examples.

*Example 1*

166 g. of powdered manganous chloride (MnCl$_2$.4H$_2$O)

and 15 cc. of water are added to 1000 g. of wool grease alcohols with a cholesterol content of 32.3% and 0.2% of ash (calculated as CaSO$_4$). This mixture is heated in an oil bath with constant stirring at 90° C. for half an hour. After cooling, the reaction mass is stirred into 5000 cc. of iso-octane or petrol, free from aromatic substances and then centrifuged. The residue is washed once by centrifuging with 1000 cc. of iso-octane.

Decomposition of the addition product with water gave 279 g. of a product containing 89.4% of cholesterol corresponding to a yield of 77.3%.

After a single recrystallization from alcohol a product is obtained containing 97% of cholesterol.

*Example 2*

2500 g. of tall oil (saponifying number 150) is saponified by boiling for two hours with a solution of 500 g. of KOH (86%) in 8000 cc. of water. The soap solution is subjected to successive extractions with petroleum ether and ether successively, the sterols (phytosterol) being dissolved for the greater part in the ether. Vaporization of the ether leaves 130 g. of unsaponifiable material with a sterol content of 37.7%.

To 100 g. of the unsaponifiable portion, 19.3 g. of powdered manganous chloride and 1.5 cc. of water are added, the mixture being then heated with continuous stirring for half an hour on a steam bath.

After cooling, the reaction mixture is treated in a shaking machine with 500 cc. of ethyl acetate, the precipitate present being then separated by centrifugation, washed with 200 cc. of ethyl acetate and then dried.

By decomposition of the addition product with water, 34.1 g. of product is obtained containing 92.8% of sterol, corresponding to a yield of 84.2%. Recrystallization from ethanol produces pure phytosterol with a melting point of 135° C.

*Example 3*

A solution of 180 g. of anhydrous calciumchloride in 500 cc. of ethylalcohol is added to a solution of 1000 g. of wool grease alcohol, containing 29.1% of cholesterol, in 1000 cc. of ethylalcohol. The mixture is left to stand for 24 hours at room temperature. Disregarding the addition product already formed, 4000 cc. of acetone are then added. The addition product obtained is separated by suction, washed with acetone and dried, 465 g. of the crude addition product with a cholesterol content of 44% are thereby obtained, corresponding to a yield of 70.2% calculated on the cholesterol.

By the addition of water in an amount of 2 l., a cholesterol yield of 55% is obtained. By a renewed treatment of the final product with calciumchloride in the above mentioned way, a yield of 75% cholesterol is recovered which is purified by recrystallization from ethylalcohol.

*Example 4*

250 g. of crystallized calciumchloride (CaCl$_2$.6H$_2$O)

are added to 1000 g. of wool grease alcohols, containing 29.1% of cholesterol. The mixture is heated for half an hour on a steam bath with continuous stirring. The viscosity of the mass, which is at first a homogeneous liquid of low viscosity, increases due to the formation of an addition product. On cooling, a relatively solid mass is formed which is mixed with 4000 cc. of acetone. The precipitate formed is separated from the mass by suction, then if desired, washed with acetone and dried. 801 g. of the crude product are obtained, corresponding to a yield of 95% calculated on cholesterol. The addition product is decomposed with water and a product is obtained contianing 42% of cholesterol in a quantitative yield.

The product can be purified before decomposition. This can be done by dissolving it in methylacetate while heating 800 g. being dissolved in 4000 cc. of the solvent. The solution is cooled and subjected to thorough extraction by treatment with decaline in countercurrent, disregarding the precipitate already formed. The separation of the constituents when using this method is very good.

After the extraction the decaline is concentrated to about 1000 cc. and the mass is washed with water till the water is free from chlorine. The rest of the decaline is removed by distillation, the residue being then dissolved in alcohol and decolorized with the decolorizing carbon. 220 g. of cholesterol are crystallized from the alcohol, corresponding to a yield of 80%, calculated on the cholesterol content of the addition production. The melting point is 148°.

*Example 5*

The concentrated acetone extract of 10 kg. of fresh bovine brain-tissue is saponified in the usual manner. The unsaponifiable portion is dissolved in enough 96% ethylalcohol, to result in a 10% solution. 250 g. of aluminum nitrate are then added and the solution heated to boiling point. The mixture is then left to stand and after 24 hours the addition product is crystallized. The addition product is then separated from the mass by suction and then decomposed with water in the same way as has been described in Example 3, corresponding to a 90% yield of 210 g. of cholesterol, is obtained which is finally crystallized from ethylalcohol.

*Example 6*

200 cc. of an alcoholic solution of cholesterol containing about 10% of cholesterol are heated for half an hour at the boiling point with a solution of 24.1 g. of crystallized aluminum chloride (AlCl$_3$6H$_2$O) in 150 cc. of ethylalcohol. On cooling 18.7 g. of the addition product are crystallized. The formula of the product is

AlCl$_3$.3C$_{27}$H$_{35}$OH

Its cholesterol content is 89.9%; theoretically 89.7%.

*Example 7*

110 g. of anhydrous zinc chloride in finely powdered conditions are added to 1000 g. of wool grease alcohols with a cholesterol content of 30.8% and the mixture is heated for half an hour on a steam bath with continuous stirring. After cooling the reaction mass is introduced into 5000 cc. of alcohol under stirring and then treated in a centrifuge. The sediment is washed once by stirring with 1000 cc. of alcohol and centrifuged.

By decomposition of the addition product with water 350 g. of a product containing 61.2% of cholesterol are recovered corresponding to a yield of 60.6%.

Further purification can be accomplished by repeated treatment with ZnCl$_2$, decomposition with water and recrystallization from alcohol.

*Example 8*

185 g. of stannous chloride (SnCl$_2$.2H$_2$O) are added to 1000 g. of wool grease alcohol with a cholesterol content of 32.4% and the mixture is heated for half an hour on a steam bath with stirring. After cooling, the reaction mixture is introduced with stirring into 5000 cc. of iso-octane or petrol free from aromatics and centrifuged. The sediment is washed by introducing with stirring into 1000 cc. of iso-octane. It is then centrifuged and dried.

By decomposition of the addition product with water 316 g. of a product are obtained containing 64.7% of cholesterol; the yield is 63.1%.

After a single recrystallization from methylalcohol a product is recovered which is already very pure; the melting point being 143° C. Further purification can be obtained by further recrystallization.

*Example 9*

230 g. of ferric chloride (FeCl$_3$.6H$_2$O) are added to 1000 g. of wool grease alcohol with a cholesterol content of 32.4% and the mixture is then heated for half an hour with constant stirring on a steam bath. After cooling the reaction mixture is stirred into 5000 cc. of iso-octane and centrifuged. The sediment is washed by once stirring it into 1000 cc. of iso-octane followed by centrifuging and dried.

By decomposition of the addition product with water 230 g. of a product are recovered containing 66.2% of cholesterol; the yield is 47.0%.

The crude product is recrystallized from ethylalcohol.

Example 10

2 g. of crystallized chromic chloride $$(CrCl_3.10H_2O)$$

are heated with vigorous stirring together with 2 g. of sitosterol and 20 g. of cetylalcohol in an oil bath and in a nitrogen atmosphere. At a temperature of the bath of 100–110° C. the molten mass becomes homogeneous due to the reaction which takes place. The mass is then dark green. The temperature of 100–110° C. is maintained for half an hour.

By the formation of the addition product the chromic chloride is now brought into a condition wherein it is more or less soluble in many organic solvents. Its solution in benzene, cyclohexane, pentane, methylacetate, etc., has a characteristic green color.

The product is only slightly soluble in methanol and cetene.

Example 11

2 g. of crystallized chromic chloride $$(CrCl_3.10H_2O)$$

are heated with 2 g. of ergosterol and 20 g. of cetylalcohol in the same way as has been described in Example 10. The cooled reaction product is more soluble than the product from Example 10 and can be dissolved in benzene, cyclohexane, pentane, methylacetate, acetone, ether, etc. with the characteristic green color of chromium compounds. It is only slightly soluble in cetene and methylformate.

Example 12

190 g. of cobaltous chloride $(CoCl_2.6H_2O)$ are added to 100 g. of wool grease alcohol with a cholesterol content of 32.4% and the mixture is heated for half an hour with constant stirring on a steam bath. After cooling the reaction mixture is stirred into 5000 cc. of ethylacetate and treated in a centrifuge. The sediment is washed by stirring once with 1000 cc. of ethylacetate and treated in a centrifuge and then dried.

By decomposition of the addition product with water 357 g. of a product are recovered containing 54.2% of cholesterol; the yield is 70.7%.

The purification can be performed by recrystallization from alcohol.

Example 13

192 g. of cadmium chloride $(CdCl_2.2.5H_2O)$ are added to 1000 g. of wool grease alcohol—chloesterol content 32.4%—and the mixture is heated for half an hour with constant stirring on a steam bath. After cooling the reaction mixture is stirred into 5000 cc. of ethylalcohol and then treated in a centrifuge. The sediment is washed once by stirring into 1000 cc. of ethylalcohol and is then centrifuged.

By decomposition of the addition product with water 170 g. of a product are obtained containing 81.3% of cholesterol; the yield is 42.7%.

After a single recrystallization from methylalcohol the product has a melting point of 140° C. The sterol is then further purified by recrystallization.

Having described our invention what we claim as new and desire to secure by Letters Patent is:

1. In the recovery and purification of sterols from mixtures thereof together with other unsaponifiable material, the process which comprises heating such a mixture under substantially anhydrous conditions with a metal salt selected from a class consisting of the halides, nitrates, sulfates, acetates, benzoates, salicylates and sulfonates of the alkali metals, the alkaline earth metals, magnesium, aluminum, iron, tin, chromium, zinc, manganese, cobalt and cadmium thereby forming a sterol-metal salt addition product, separating said addition product from the reaction mixture, decomposing the addition product to produce the free sterol and recovering the latter.

2. The process of claim 1 wherein the mixture of salt and sterol-containing material is heated to a temperature within the range of about 80 to 120 degrees centigrade to produce the addition product.

3. The process of claim 1 wherein the reaction between the salt and sterol-containing material is conducted in the presence of an inert organic solvent.

4. The process of claim 1 wherein the salt used contains water of crystallization.

5. The process of claim 1 wherein the reaction between the salt and sterol-containing material is conducted in the presence of from about 0.2 to 5 per cent of water based on the sterol-containing material.

6. The process of claim 1 wherein the addition product is decomposed by contacting it with water.

7. The process of claim 1 wherein the sterol-containing material is wool grease alcohols and the sterol recovered is cholesterol.

8. The process of claim 1 wherein the sterol-containing material is the unsaponifiable fraction of tall oil, obtained by hydrolyzing tall oil and removing the saponifiable portion of the hydrolytic products, and the sterol recovered is phytosterol.

9. The process of claim 1 wherein the sterol-containing material is obtained by saponifying bovine brain-tissue and removing the saponified fraction.

10. In the recovery of sterols from organic raw materials containing the same at least partly in the form of their fatty acid esters, the process which comprises subjecting such a raw material to a hydrolyzing step, separating the hydrolytic products into a saponifiable fraction and an unsaponifiable fraction, heating the latter fraction with a soluble metal salt selected from a class consisting of the halides, nitrates, sulfates, acetates, benzoates, salicylates and sulfonates of the alkali metals, the alkaline earth metals, magnesium, aluminum, iron, tin, chromium, zinc, manganese, cobalt and cadmium, thereby forming a sterol-metal salt addition product, separating said addition product from the reaction mixture, decomposing the addition product to produce free sterol and recovering the latter.

11. The process of claim 10 wherein the salt employed is manganous chloride.

12. The process of claim 10 wherein the salt employed is calcium chloride.

13. The process of claim 10 wherein the salt employed is chromic chloride.

14. In the recovery of cholesterol from wool grease alcohols, the process which comprises heating wool grease alcohols with manganous chloride in the presence of from about 0.5 to 5 per cent water based on the weight of the wool grease alcohols to form a manganous chloride-cholesterol addition product, separating the addition product from the reaction mixture, adding water to decompose the addition product and to produce free cholesterol and recovering the latter.

15. In the recovery and purification of sterols from mixtures thereof together with other unsaponifiable material, the process which comprises reacting such a mixture in the presence of an inert organic solvent with a sufficient quantity of a metal salt to produce a precipitate of a sterol-metal salt addition product, said salt being of a type known to produce addition products with lower aliphatic alcohols and phenols, and selected from a class consisting of the halides, nitrates, sulfates, acetates, benzoates, salicylates and sulfonates of the alkali metals, the alkaline earth metals, magnesium, aluminum, iron, tin, chromium, zinc, manganese, cobalt and cadmium, separating the addition product from the solution, adding water to produce the free sterol and recovering the latter.

JOHAN OVERHOFF.
JOHANNES THOMAS HACKMANN.

REFERENCES CITED

The following references are of record in the file of this patent:

UNITED STATES PATENTS

| Number | Name | Date |
|---|---|---|
| 2,220,114 | Natelson | Nov. 5, 1940 |
| 2,248,346 | Gayer | July 8, 1941 |
| 2,302,828 | Yoder | Nov. 24, 1942 |
| 2,362,605 | Goder | Nov. 14, 1944 |

FOREIGN PATENTS

| Number | Country | Date |
|---|---|---|
| 58,771 | Netherlands | Jan. 15, 1947 |
| 60,735 | Netherlands | Mar. 15, 1948 |

OTHER REFERENCES

Montignie: Bull. Soc. Chim. 45, 302–304 (1929).

Goldhammer: Biochem. Zeit, 267, 406–416 (1933).

Montignie: Bull. Soc. Chim. (5) 2, 1367 (1935).